(12) United States Patent
Bae et al.

(10) Patent No.: US 8,773,427 B2
(45) Date of Patent: Jul. 8, 2014

(54) METHOD AND APPARATUS FOR MULTIVIEW IMAGE GENERATION USING DEPTH MAP INFORMATION

(75) Inventors: Soo Hyun Bae, San Jose, CA (US); Alexander Berestov, San Jose, CA (US); Farhan Baqai, Fremont, CA (US); Seijiro Inaba, Kanagawa (JP); Ryota Kosakai, Tokyo (JP); Naoya Katoh, Chiba (JP)

(73) Assignee: Sony Corporation, Tokyo (JP)

( * ) Notice: Subject to any disclaimer, the term of this patent is extended or adjusted under 35 U.S.C. 154(b) by 867 days.

(21) Appl. No.: 12/976,944

(22) Filed: Dec. 22, 2010

(65) Prior Publication Data

US 2012/0162193 A1    Jun. 28, 2012

(51) Int. Cl.
*G06T 15/00* (2011.01)
*G06T 7/00* (2006.01)

(52) U.S. Cl.
CPC ................................. *G06T 7/0065* (2013.01)
USPC ............ 345/419; 345/420; 345/422; 382/285

(58) Field of Classification Search
CPC .......................... G06T 7/0065; H04N 13/0003
USPC ............................. 345/419, 420, 422; 382/285
See application file for complete search history.

(56) References Cited

U.S. PATENT DOCUMENTS

| | | | |
|---|---|---|---|
| 3,656,124 A | 4/1972 | McGee | |
| 5,982,845 A | 11/1999 | Sidoti et al. | |
| 7,224,355 B2 * | 5/2007 | Auberger et al. | 345/419 |
| 7,391,418 B2 | 6/2008 | Pulli et al. | |
| 7,525,553 B2 | 4/2009 | Barenbrug et al. | |
| 8,270,768 B2 * | 9/2012 | Ernst et al. | 382/285 |
| 2004/0135780 A1 | 7/2004 | Nims | |
| 2006/0045329 A1 | 3/2006 | Jones et al. | |
| 2006/0082575 A1 | 4/2006 | Auberger et al. | |
| 2007/0024614 A1 | 2/2007 | Tam et al. | |
| 2009/0116732 A1 | 5/2009 | Zhou et al. | |
| 2010/0073364 A1 | 3/2010 | Jung et al. | |
| 2010/0142824 A1 | 6/2010 | Lu | |

FOREIGN PATENT DOCUMENTS

| | | |
|---|---|---|
| CN | 1799266 A | 7/2006 |
| CN | 101556696 A | 10/2009 |
| WO | WO 2008/057107 A2 | 5/2008 |
| WO | WO-2010/013171 A1 | 2/2010 |
| WO | WO 2010/013171 A1 | 2/2010 |
| WO | WO 2010/041176 A1 | 4/2010 |
| WO | WO 2012/010220 A2 | 1/2012 |

OTHER PUBLICATIONS

Extended European Search Report dated Apr. 18, 2013 for Application No. 11185127.5-1902/2469865.
"Coding and Rendering of 3d Video Sequences and Applications to Three-Dimensional Television (3DTV) and Free Viewpoint Television (FTV)", Ismaël Daribo, Dissertation at Graduate College of Telecom ParisTech, Jan. 1, 2009, 182 pages.
First Office Action from the Chinese Patent Office dated Jan. 17, 2014 for corresponding Chinese Application No. 201110317297.0, received Feb. 21, 2014, 6 pages.

* cited by examiner

*Primary Examiner* — Phu K Nguyen
(74) *Attorney, Agent, or Firm* — Moser Taboada

(57) ABSTRACT

A method and apparatus for multiview image generation using depth map information is described. In one embodiment, a computer-implemented method comprises converting a input image and an input depth map into a projected image and a projected depth map using values from physical pixel locations that map to projected pixel locations, wherein the projected image and the projected depth map are associated with a particular view of the input image, inpainting the projected image and the projected depth map and producing an output image in a direction of the particular view using the inpainted projected image and the inpainted projected depth map.

20 Claims, 16 Drawing Sheets

METHOD AND APPARATUS FOR MULTIVIEW IMAGE GENERATION USING DEPTH MAP INFORMATION

BACKGROUND

1. Technical Field

Embodiments of the present disclosure generally relate to an image processing system and, in particular, to a method and apparatus for performing multi-view image generation.

2. Description of the Related Art

Image capturing and/or video recording devices constitute a significant portion of the current global consumer electronics market. The widespread usage of such devices brings to light various defects. For example, these devices store images and/or video frames as merely two dimensional representations of a scene. Even if a depth map is provided, a three-dimensional representation cannot be rendered and viewed without utilizing significant processing power and memory capacity. In order to conserve resources, current technologies, therefore, limit these devices to capturing images depicting one of only a few possible views of the scene.

Systems that are designed for processing and storing multi-view images causes artifacts. Artifacts, generally, include noticeable distortions of media (e.g., an image, audio and/or video) due to the application of an overly aggressive or inappropriate lossy data compression algorithm. When such an image is received, a block-by-block decoding of the image is performed to reconstruct the transferred image. The quantization of the individual image blocks is necessarily associated with a loss of information that can result in visible edges at the block boundaries during the reconstruction. These artifacts can be especially prominent when a very rough quantization is provided corresponding to large quantization parameters.

Therefore, there is a need in the art for a method and apparatus for multi-view image generation that uses depth map information and produces fewer artifacts.

SUMMARY

Various embodiments of the present disclosure generally include a method and apparatus for multi-view image generation using depth map information. In one embodiment, a computer-implemented method for performing multi-view image generation using depth map information includes converting a input image and an input depth map into a projected image and a projected depth map using values from physical pixel locations that map to projected pixel locations, wherein the projected image and the projected depth map are associated with a particular view of the input image, inpainting the projected image and the projected depth map and producing an output image in a direction of the particular view using the inpainted projected image and the inpainted projected depth map.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
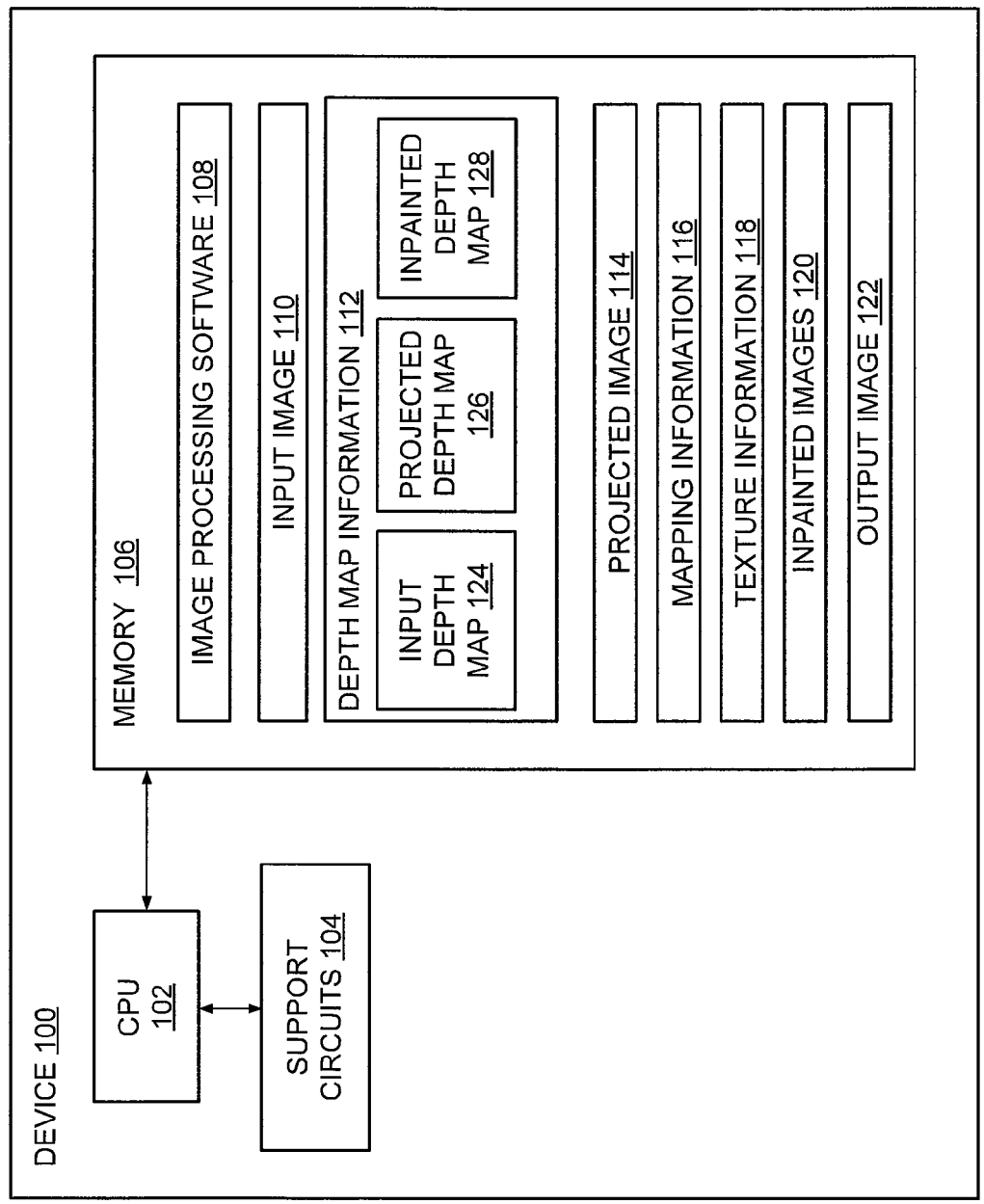
FIG. 1 is a block diagram that illustrates a device for performing multi-view image generation using depth map information in accordance with at least one embodiment.

FIG. 1 illustrates a device 100 for multi-view image generation using depth map information accordance with at least one embodiment. The device 100 is a type of computing device (e.g., a laptop, a camera, a desktop, a server, a mobile device, a multimedia recording device and/or the like) that comprises a Central Processing Unit (CPU) 102, support circuits 104 and a memory 106. The CPU 102 comprises one or more commercially available microprocessors or microcontrollers that facilitate data processing and storage. The support circuits 104 facilitate operation of the CPU 102 and include clock circuits, buses, power supplies, input/output circuits and/or the like. The memory 106 includes a read only memory, random access memory, disk drive storage, optical storage, removable storage, and the like.

The memory 106 further includes various software packages, such as the image processing software 108. The memory 106 further stores various data, such as an input image 110, depth map information 112, a projected image 114, mapping information 116, texture information 118, one or more inpainted images 120 and an output image 122. In some embodiments, the input image 110 and the output image 122 include a left eye image and a right eye image, respectively, that combine to form a particular three-dimensional view. Furthermore, the input image 110 may be transformed into the left eye image of the particular three-dimensional view. The depth map information 112 further includes an input depth map 124, a projected depth map 126 and an inpainted depth map 128.

The image processing software 108 includes software code (processor executable instructions) for performing multi-view image generation using the input image 110 and the input depth map 124. After transforming the input image 110, the image processing software 108 projects the transformed input image onto the projected image 114. Then, the image processing software 108 interpolates depth values and/or intensity (i.e., color) values for pixels within the right eye image using values from the input image 110. In some embodiments, the values being interpolated are associated with pixels within the input image 110 that map to the projected locations within the projected image 114, as indicated in the mapping information 116.

Missing or occluded regions within the projected image are inpainted using the inpainted depth map 128 and/or the texture information 118. In some embodiments, the projected depth map 126 is inpainted using depth values from the input depth map 124 or a transformed copy thereof. By inpainting the occluded regions within the projected depth map 126, the image processing software 108 produces the inpainted depth map as explained further below in the description of FIG. 4.

Each pixel within the input image 110 corresponds with various values indicating a color (i.e., intensity values), a depth and/or a texture. The each pixel may also be associated with scene information for the input image 110. The pixels of the input image 110, for example, may depict a two-dimensional representation of a scene where each pixel is associated with one or more intensity values indicating a relative strength of one or more corresponding color components. The input depth map 126 include depth values reflecting distance and opacity of the each pixel. In some embodiments, the each pixel includes a five-component representation that can be expressed as an image processing tensor that includes at least a single dimensional image processing matrix (i.e., vector) for at least a two-dimensional image.

An exemplary embodiment of such a matrix is as follows:

$$\begin{bmatrix} x_1 \\ x_2 \\ x_3 \\ \partial_h x \\ \partial_v x \end{bmatrix}$$

This image processing matrix includes primary color components $[x_1, x_2, x_3]$ for the input image 110, $\partial_h x$ (i.e., the product of partial derivative along a horizontal direction and a normalization of the primary color components) and $\partial_v x$ (i.e., the product of partial derivative along a vertical direction and a normalization factor of the primary color components). $x_1$, $x_2$ and $x_3$ are intensity values for the primary color components (e.g., red, green, blue (RGB) components), where each intensity value represents an amount or saturation of a particular color in the pixel. For example, if the pixels include a full or strong intensity for each primary color component, the input image 110 appears completely white. In addition, an intensity value for a block of pixels may be approximated or computed without examining the intensity values for each pixel.

The texture information 118 indicates texture strength for each pixel within the input image 110 or a transformed input image as well as the projected image 114. The texture strength, generally, is a measure of the variation of the intensity of a surface, quantifying properties such as smoothness, coarseness and regularity. The three principal approaches used to describe texture are statistical, structural and spectral. Statistical techniques characterize texture by the statistical properties of the grey levels of the points comprising a surface. Typically, these properties are computed from the grey level histogram or grey level co-occurrence matrix of the surface. Structural techniques characterize texture as being composed of simple primitives called "texels" (texture elements), that are regularly arranged on a surface according to some rules. Spectral techniques are based on properties of the Fourier spectrum and describe global periodicity of the grey levels of a surface by identifying high energy peaks in the spectrum.

Figure 2:
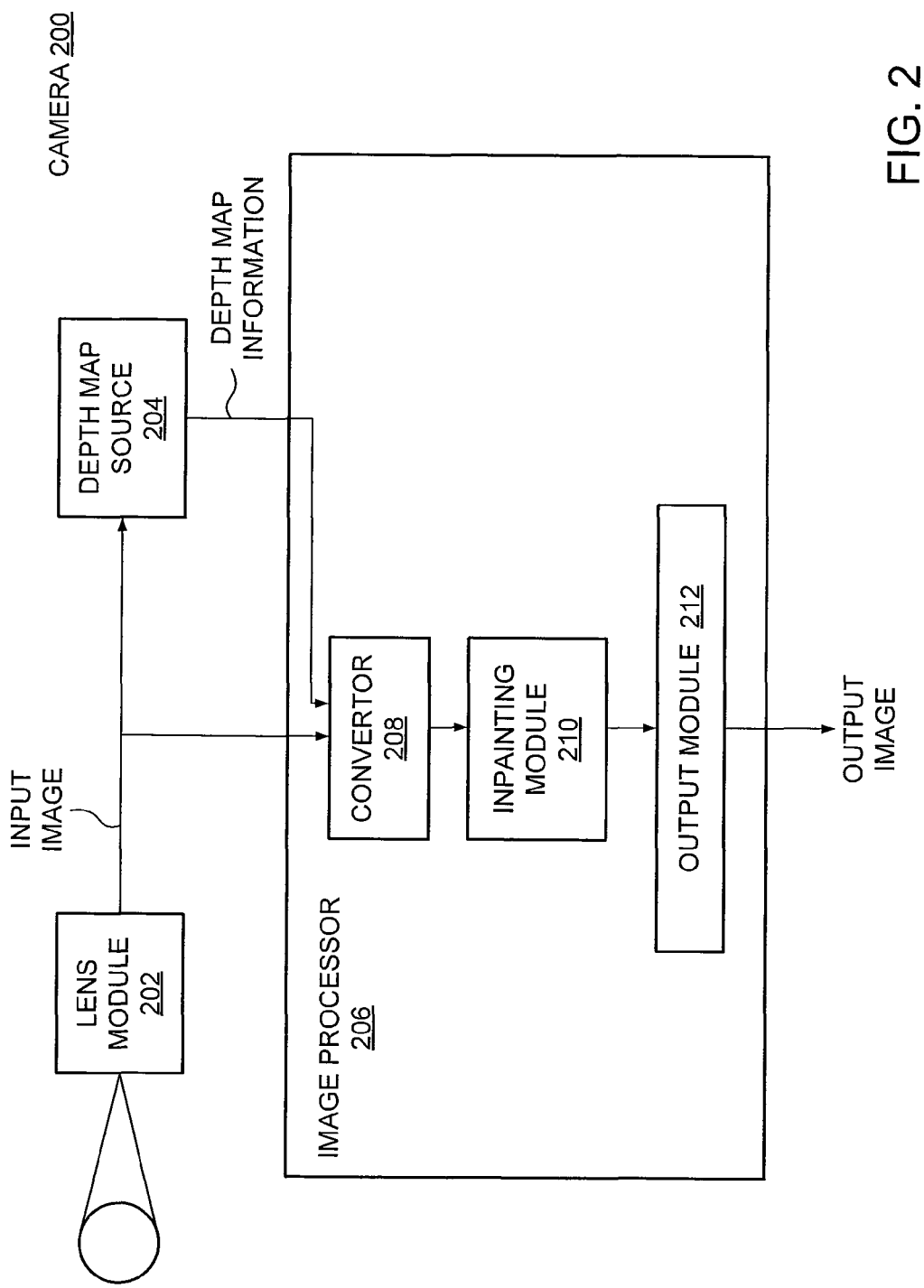
FIG. 2 is a functional block diagram that illustrates a camera for capturing output images in multiple views in accordance with at least one embodiment.

FIG. 2 is a functional block diagram that illustrates a camera 200 for capturing input images and generating output images in multiple views, according to one or more embodiments. The camera 200 utilizes a lens module 202, a depth map source 204 and an image processor 206 to produce the output image. The lens module 202 is operatively coupled with the depth map source 204 and captures the input images or video frames for a scene. The depth map source 204 stores depth maps associated with the captured input images or video frames, which are accessed by the image processor 206.

The lens module 202 captures an input and sends the input as an image, such as the input image 110, to the image processor 206. In some embodiments, the lens module 202 captures a beam of light from two different viewpoints that are horizontally displaced from each other (i.e., disparity between a left eye and a right eye). The input image may be associated with either the right eye or the left eye. In some embodiments, the horizontal displacement or disparity between the two viewpoints is approximately sixty-five (65) mm, an average distance between a person's left and right eyes. In some embodiments, the image processor adjusts the disparity and produces an output image having a different view.

The image processor 206 is a circuit that accesses depth map information and the input image and produces the output image, such as the output image 122. In some embodiments, the image processor 206 includes hardware components for executing image processing software (e.g., the image processing software 108 of FIG. 1). In some embodiments, the image processor 206 includes various modules, such as a convertor 208, an inpainting module 210 and an output module 212. The convertor 208 and the inpainting module 210 are explained further below in the descriptions for FIGS. 3 and 4, respectively.

Figure 3:
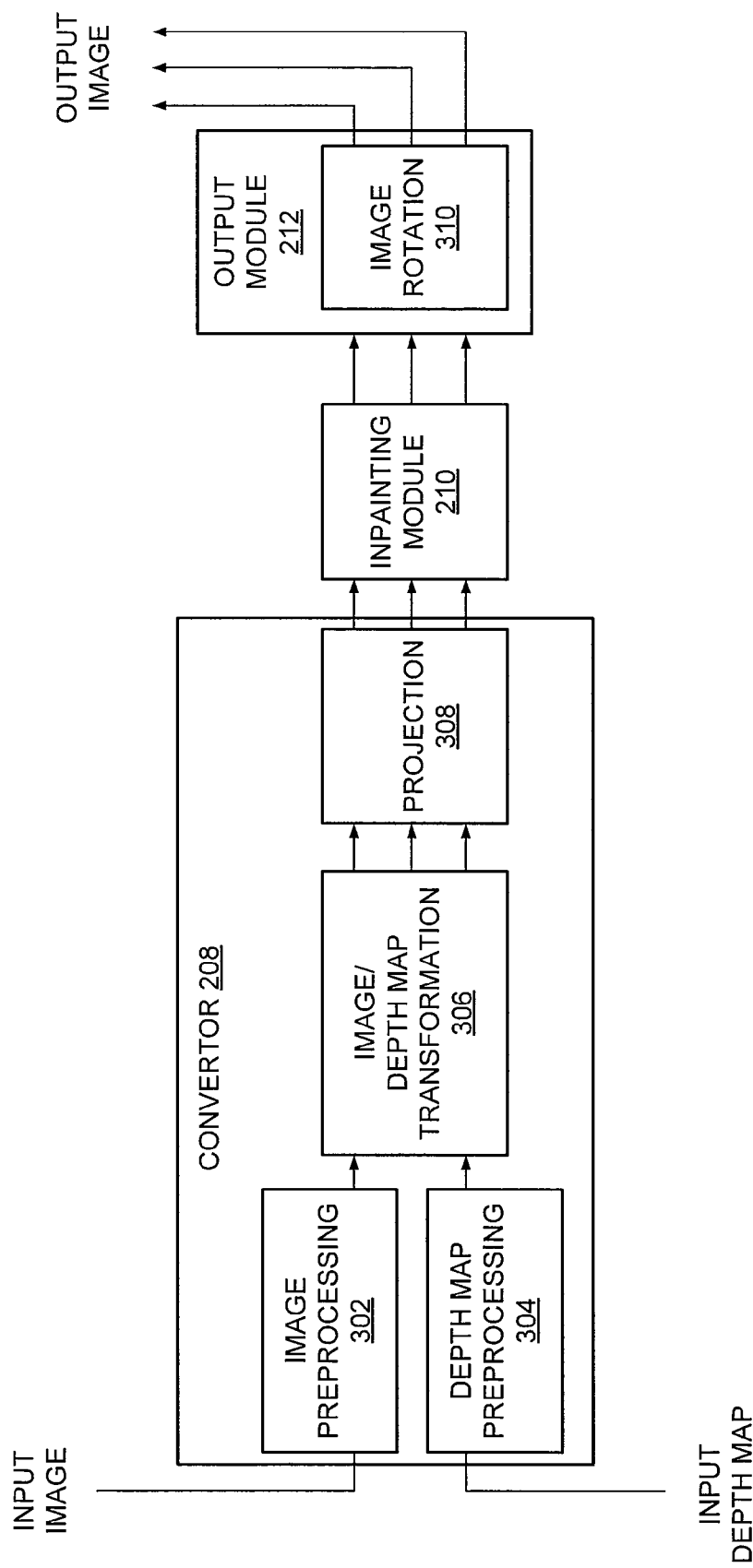
FIG. 3 is a functional block diagram that illustrates a image processor for performing multi-view image generation using depth map information in accordance with at least one embodiment.

FIG. 3 is a functional block diagram that illustrates a multi-view image generation process 300 in accordance with at least one embodiment. The process 300 includes operations that are performed by an image processor (e.g., the image processor 206 of FIG. 2). The process 300 commences when the input image and the input depth map are communicated to the convertor 208. The convertor 208 includes various modules for converting the input image and input depth map. Initially, the input image and the input depth map are preprocessed by module 302 and module 304, respectively. In some embodiments, the module 304 applies a filter to the input depth map to reduce effects from artifacts and produce more accurate depth values.

Then, the preprocessed input image and the preprocessed input depth map are transmitted to a module 306 that performs one or more rotation and/or translation operations. As a result, the preprocessed input image and the preprocessed input depth map are transformed into an image and a depth map associated with a different view. In other words, pixels with the transformed image and the transformed depth map are projected in a different direction from the input image and the input depth map. For example, an image associated with a center view is flipped or rotated in order to generate an image associated with a left view. As another example, the image associated with the center view is rotated 90° clockwise once to create an image is directed to a bottom view.

The process 300 proceeds to a module 308 for performing a three-dimensional projection (e.g., a forward projection) from the transformed image and the transformed depth map onto the projected image and the projected depth map. Together, the projected image and the projected depth map along with the transformed input image and the transformed depth map form a particular view. In some embodiments, the transformed image constitutes a left eye image, which along with the projected input image that is a stereoscopically complimentary right eye image, forms a three-dimensional view (e.g., center view, left view, right view, far right view, far left view and/or the like) as explained in the description for FIGS. 10, 11 and 12.

After identifying physical pixel locations for pixels within the transformed input image, the module 308 maps each of these pixels onto a projected pixel location in the projected image. Subsequently, the module 308 communicates the projected image and the projected depth map to the inpainting module 210. In addition, the module 308 communicates indices for any occluded pixels that are identified during the projected pixel location computation. One or more adjacent occluded pixels form an occluded region to be inpainted as described further below.

After performing various inpainting techniques (e.g., three dimensional inpainting on occluded regions) on one or more copies of the projected image, the inpainting module 210 produces the output image. In some embodiments, the inpainting module 210 receives the inpainted right eye depth map and identifies one or more occluded regions within the right eye image copy. The image processor selects and inpaints an occluded region using pixels associated with locations to a right of the selected occluded region. Once each occluded region is inpainted, the image processor produces the inpainted copy of the right eye image. After performing primitive inpainting on another copy of the right eye image. In some embodiments, the image processor copies values from the input image that map to locations within the other copy of the right eye image that are to the right of a target region.

For each target region, the image processor translates these locations into projected locations within the input image and, ultimately, into physical locations within the input image. Certain values associated with these physical locations are used to inpaint the each target region within the projected image. The process 300 continues to the output module 212 where the image processor blends the inpainted copy of the projected image with the other inpainted copy of the projected image to produce the output image 122. If necessary, a module 310 rotates the output image 122 to form the particular view desired by a user.

Figure 4:
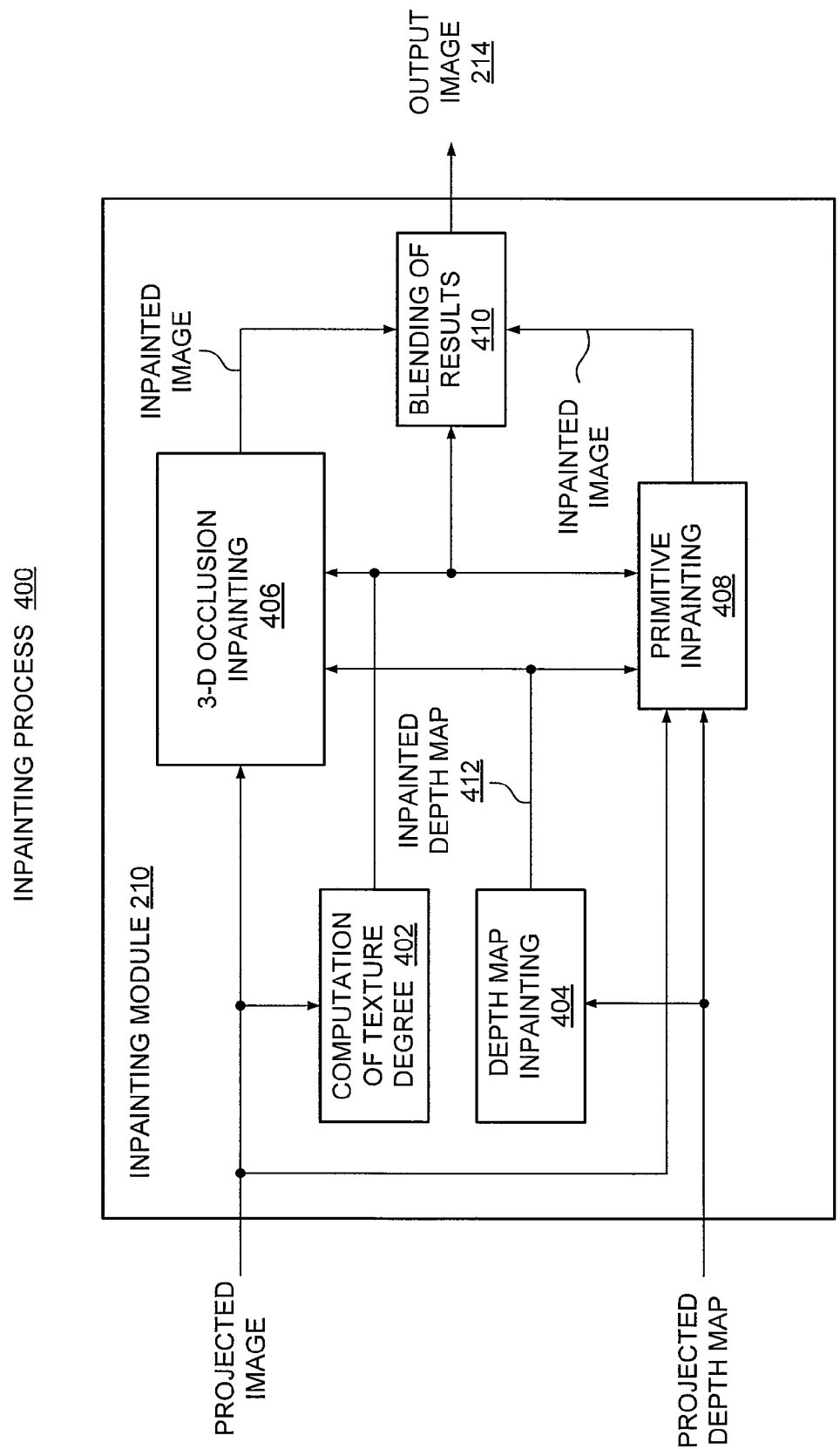
FIG. 4 is a functional block diagram that illustrates an inpainting module for inpainting at least one image and at least one depth map in accordance with at least one embodiment.

FIG. 4 is a functional block diagram that illustrates an inpainting process 400 on at least one image and at least one depth map in accordance with at least one embodiment. The inpainting module 210 performs various operations for completing the inpainting process 400 as described below.

The inpainting module 210 processes a projected image and a projected depth map as input from a convertor (e.g., the convertor 208 of FIG. 2). The projected image is communicated to a module 402 for computing a texture degree. For each occluded region, the module 402 measures the texture degree or strength, which is stored in texture information. A module 404 accesses the projected depth map and proceeds to inpaint target regions, such as occluded regions. In some embodiments, the module 404 identifies one or more occluded regions (e.g., blocks of pixels) within the projected depth map and uses values from an original image to fill-in such regions. The original image may be an image captured by a camera or transformed from such an image into one whose pixels are directed in a particular view. For each occluded region, the module 404 identifies a source region within the original image and copies depth values from the source region into the occluded region. In some embodiments, the module 404 identifies a source region having a minimal dissimilarity with the occluded region. In some embodiments, such a source region maps to a projected location in the projected image that is to the right of the occluded region being inpainted.

Accordingly, the module 404 produces an inpainted depth map, which is communicated to a module 406. Because the one or more occluded regions are also present in the projected image, the module 406 uses inpainted depth values to compute intensity values for such regions. Meanwhile, a module 408 processes the projected depth map and the projected image and performs operations for primitive inpainting on the occluded regions.

Figure 5:
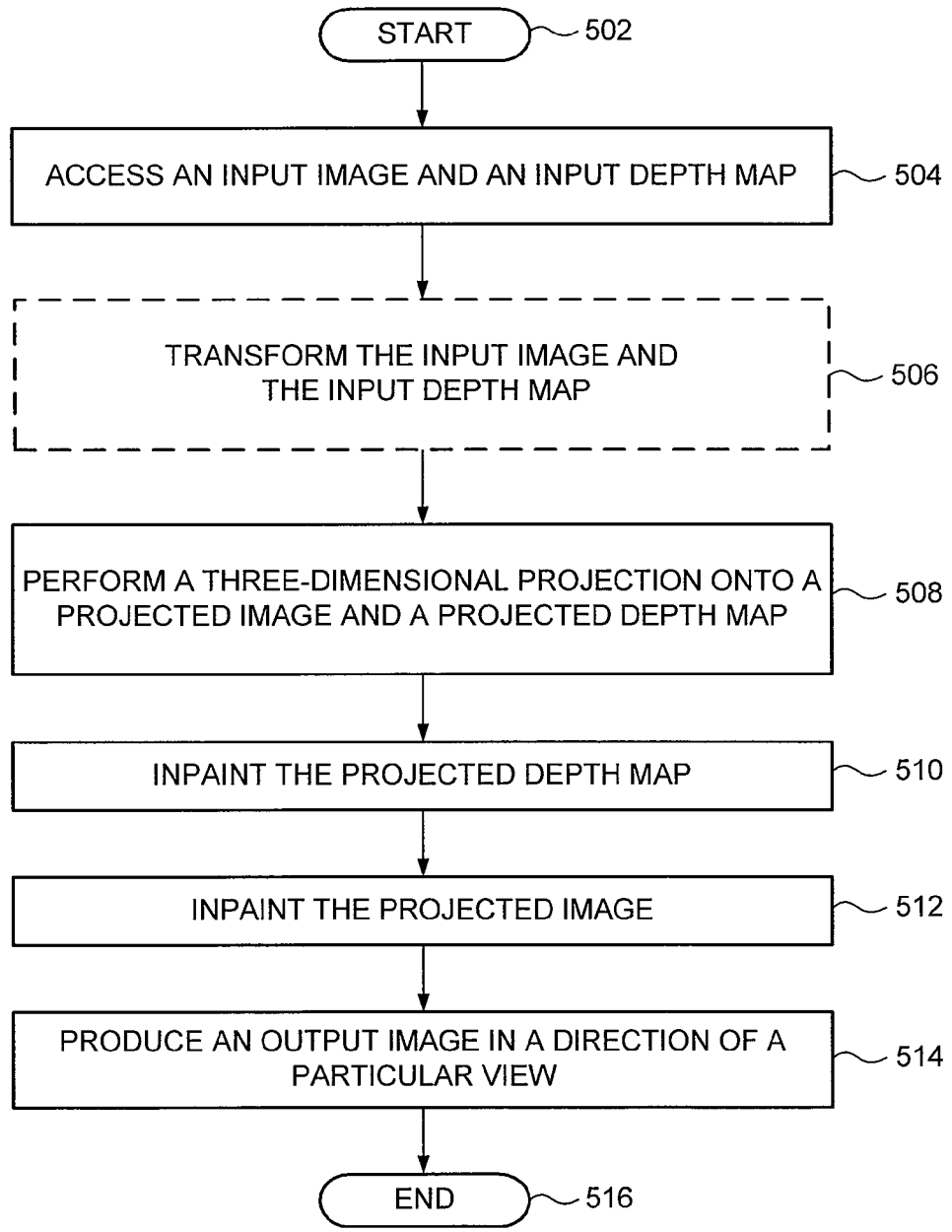
FIG. 5 is a flow diagram that illustrates a method for performing multi-view image generation using depth map information in accordance with at least one embodiment.

FIG. 5 is a flow diagram that illustrates a method 500 for performing multi-view image generation using depth map information in accordance with at least one embodiment. Each and every step of the method 500 may be performed by image processing software (e.g., the image processing software 108 of FIG. 1) or an image processor (e.g., the image processor 206). In other embodiments, one or more steps are omitted.

The method 500 starts at step 502 and proceeds to step 504. At step 504, the method 500 accesses an input image and an input depth map. After step 504, the method 500 performs optional step 506 or proceeds to step 508. At optional step 506, the method 500 transforms the input image and the input depth map. In some embodiments, the input image and the input depth map are associated with a certain view of a scene composed of a foreground and/or a background. In order to generate multiple views of the scene, the input image and the input depth map are rotated and/or translated into a transformed input image and a transformed input depth map. For example, the input image that is directed towards a right view may be flipped or rotated 180° to create the transformed image that is directed in a left view.

Alternatively, the method 500 skips the optional step 506 after performing step 504 and instead proceeds directly to step 508. Because the method 500 may produce images that are directed into multiple three-dimensional views from images that are directed in any view including the center view, the method 500 may use untransformed versions of the input image and the input depth map to perform the three-dimensional projection.

At step 508, the method 500 performs a three-dimensional projection onto a projected image and a projected depth map associated with a particular three-dimensional view, such as a right view, a left view, a top view and a bottom view. The three dimensional view may also include a far right view, a far top view, a far top left view, a top right view, a bottom left view, a far bottom left view, a bottom far left view and/or the like. If the method 500 performs the optional step 506, the method 500 uses translated versions of the input image and the input depth map. If, on the other hand, the method 500 skips the optional step 506, performs the projection from the input image and the input depth map onto the projected image and the projected depth map. In some embodiments, the particular view is a three-dimensional view and may be expressed in different disparity measurements. In order to produce the particular three-dimensional view, a right eye image and a left eye image for the scene are rendered.

At step 510, the method 500 inpaints the projected depth map. Various embodiments of the step 510 are described below for FIG. 7. At step 512, the method 500 inpaints the projected image. Various embodiments of the step 512 are described below for FIG. 8. At step 514, the method 500 produces an output image in a direction of the particular three-dimensional view. At step 516, the method 500 ends.

Figure 6A:
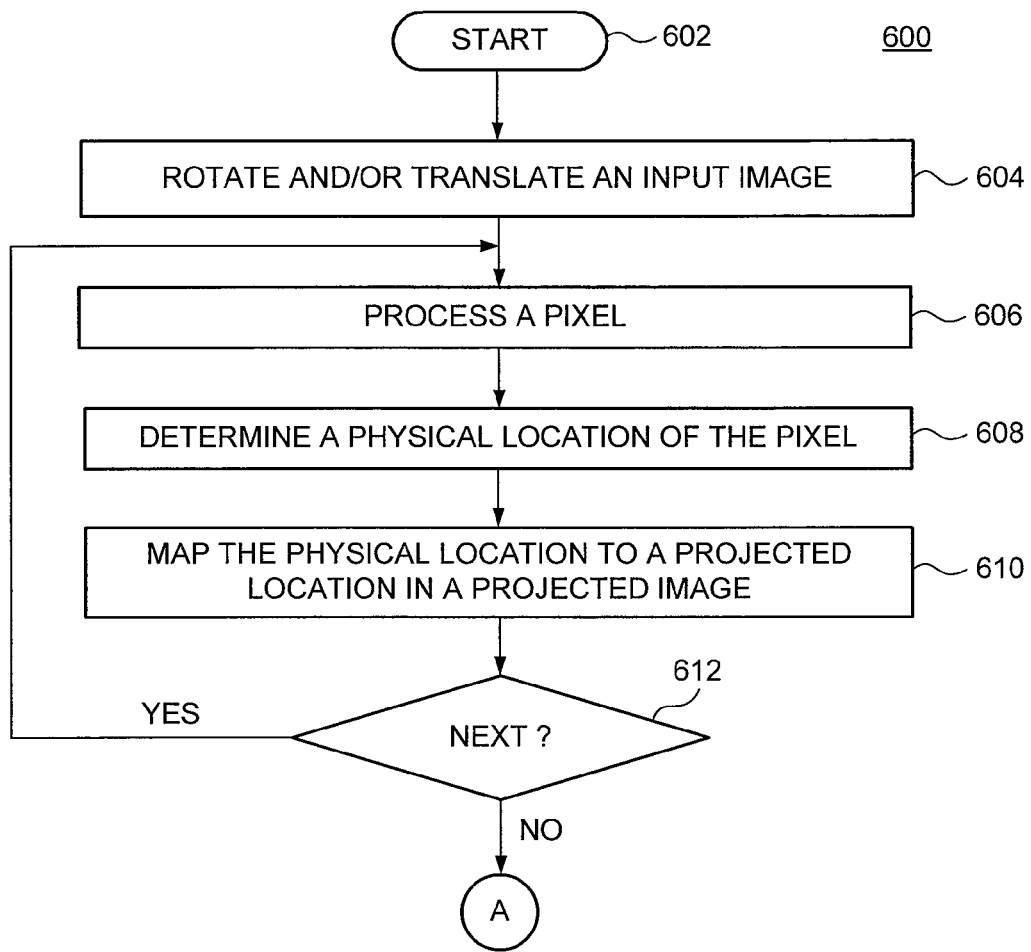
FIG. 6 is a flow diagram that illustrates a method for performing a three-dimensional projection from a left eye image and a left eye depth map onto a right eye image and a right eye depth map using an input image and an input depth map in accordance with at least one embodiment.
Figure 6B:
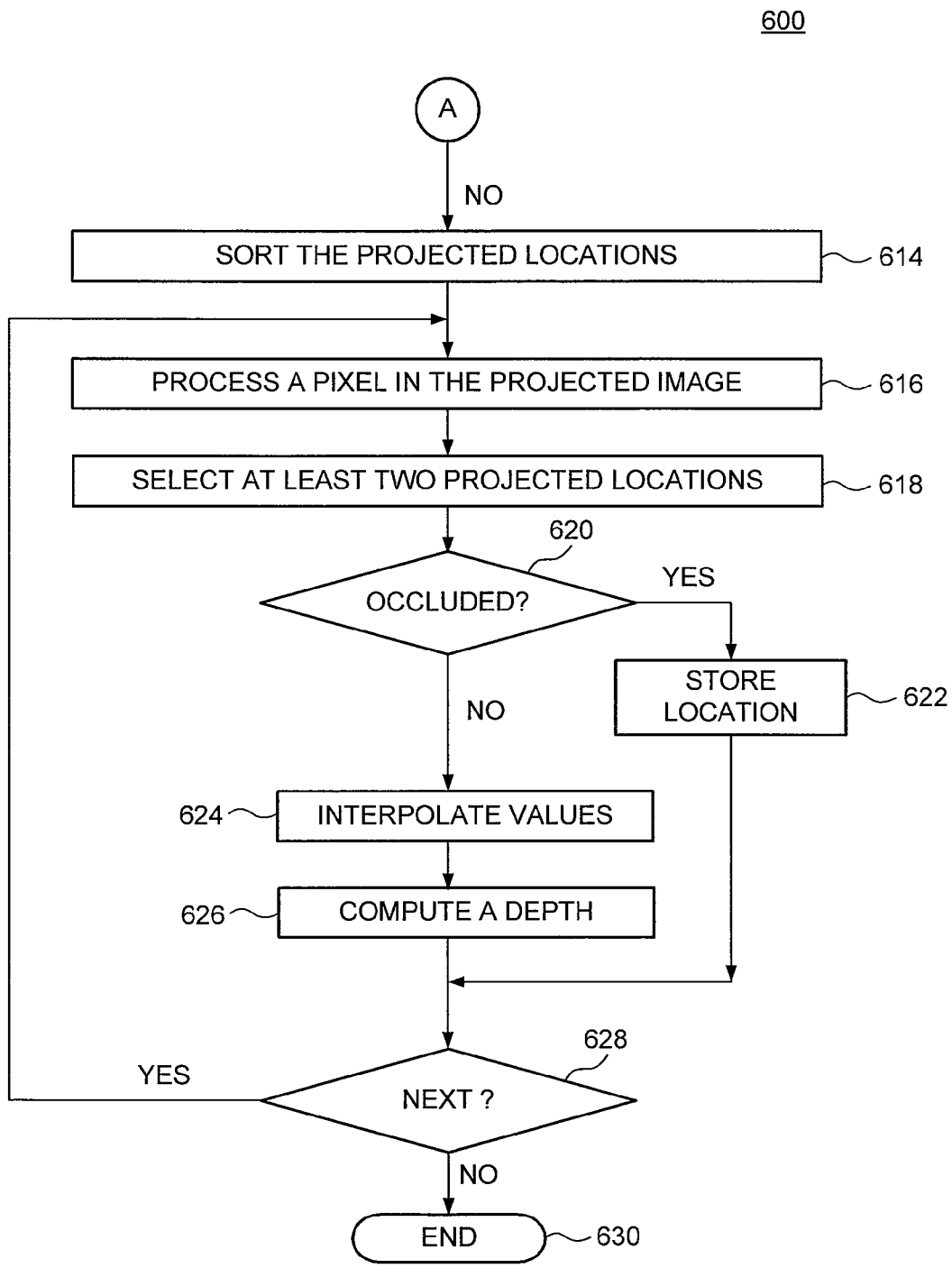

FIG. 6 is a flow diagram that illustrates a method 600 for performing a projection from an input image and an input depth map onto a projected image and a projected depth map. Each and every step of the method 600 may be performed by a convertor (e.g., the convertor 208 of FIG. 2) of an image processor (e.g., the image processor 206 of FIG. 2). In other embodiments, one or more steps are omitted.

The method 600 starts at step 602 and proceeds to step 604. At step 604, the input image (i.e., center view) and the input depth map (i.e., center view) are transformed into a particular three-dimensional view, such as a right view or a left view, through rotation and/or translation. For example, if the input image is a center view image, the method 600 translates the input image into a right view by shifting pixel values to the right. if the input image and the input depth map are directed to a three-dimensional right view, the method 600 rotates or flip pixel information to to form a three-dimensional left view.

In some embodiments, steps 606 to step 612 depict a three-dimensional projection from a center view image and a center view depth map onto a projected image and a projected depth map. After rotating and/or translating the center view image and the center view depth map, the image and the depth map form a left eye image and a left eye depth map, respectively, of a particular three-dimensional view. Accordingly, the method 600 performs the three-dimensional projection from the left eye image and the left eye depth map onto a right eye image and a right eye depth map during which right eye pixels are classified as occluded or non-occluded. Subsequently, the method 600 performs step 614 to step 630, which illustrate intensity and depth value interpolation for non-occluded pixels in the projected image (e.g., right eye image) as explained in detail below.

Figure 10:
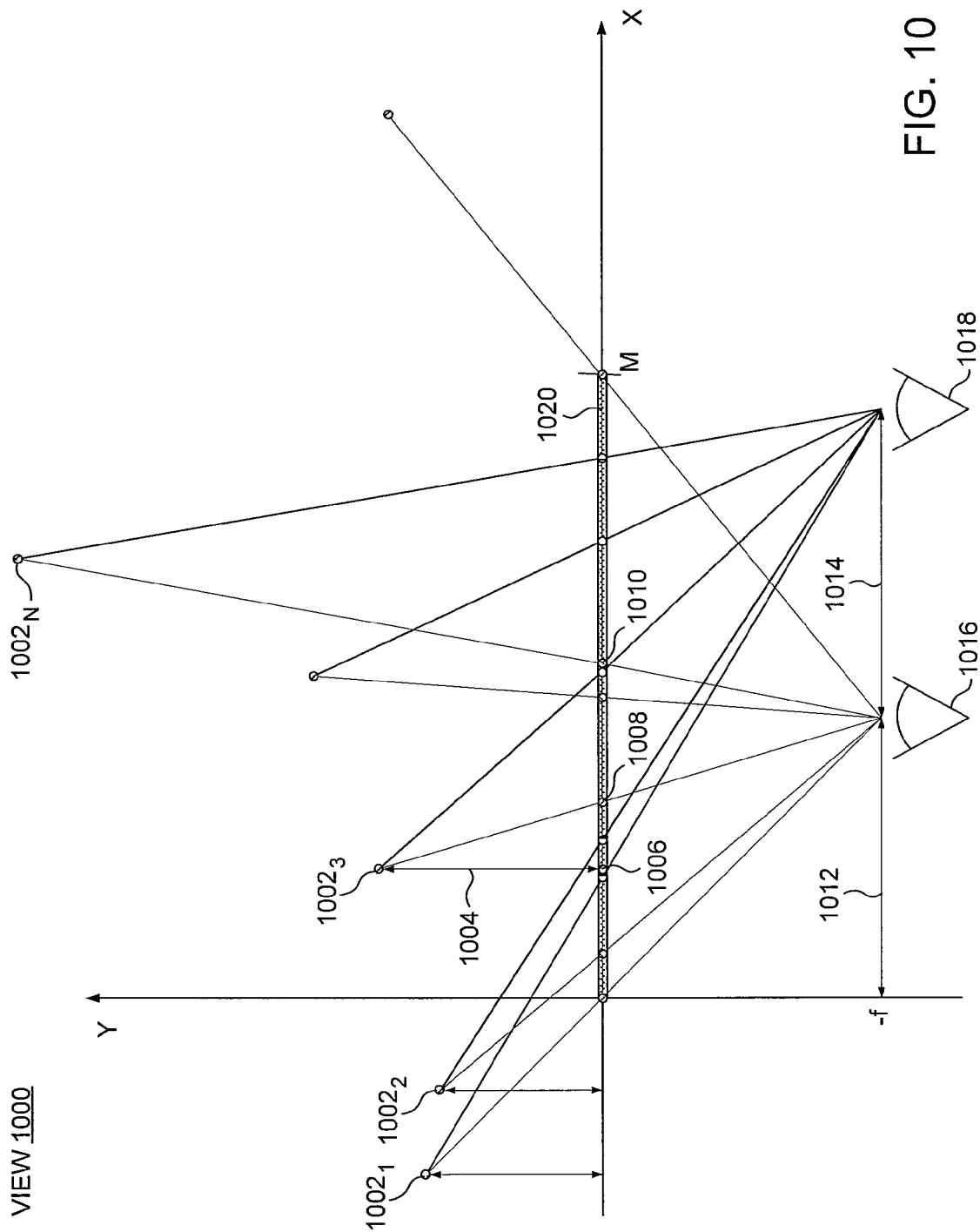
FIG. 10 depicts a three-dimensional projection in a particular view in accordance with at least one embodiment.
Figure 11:
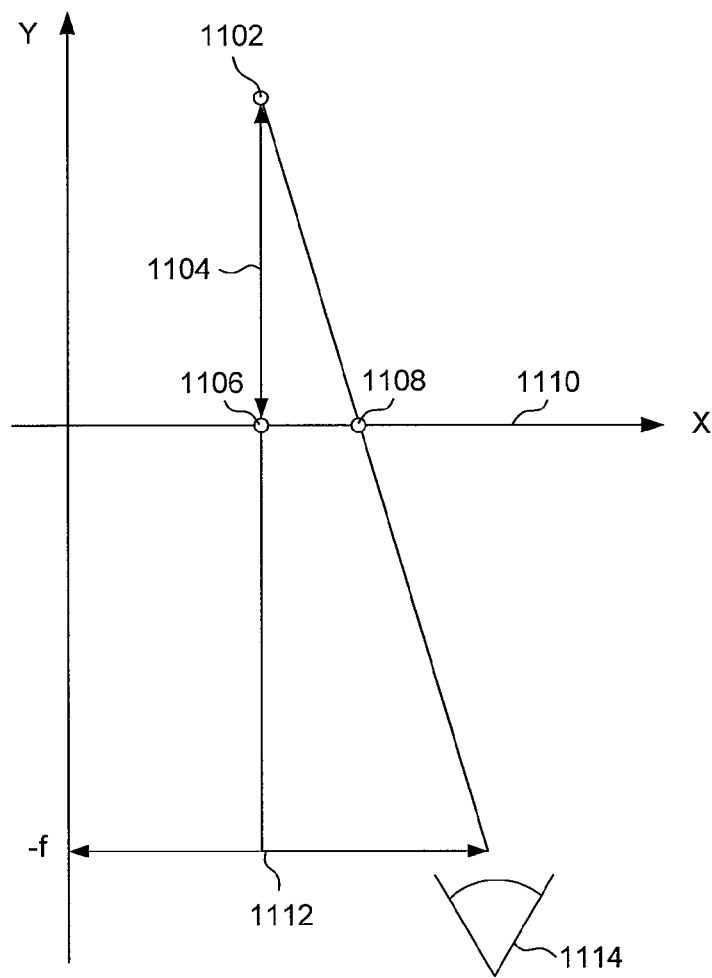
FIG. 11 depicts a right eye of a particular view in accordance with at least one embodiment.
Figure 12:
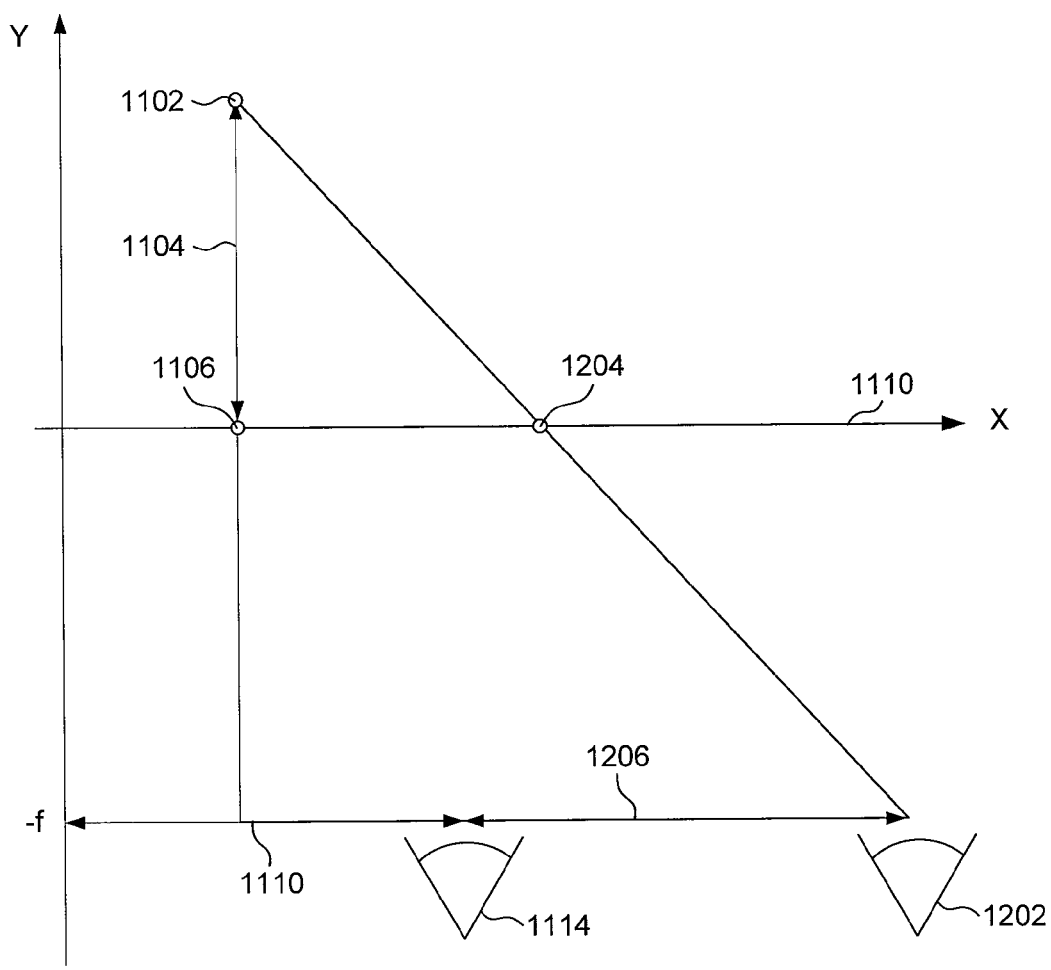
FIG. 12 depicts a left eye of a particular view in accordance with at least one embodiment.

At step 606, the method 600 processes a pixel in the rotated and/or translated input image. At step 608, the method 600 determines a physical pixel location. In some embodiments, the physical pixel location is an orthogonal projection of light from a light source associated with the pixel in the rotated and/or translated input image (i.e., left eye image). At step 610, the method 600 maps the physical pixel location to a projected pixel location in the projected image. The method 600 creates a new projected image (i.e., right eye image) to store values associated with each and every projected pixel location. At step 612, the method 600 determines whether there is a next pixel. If the method 600 determines that there is a next pixel within the rotated and/or translated input image to be projected onto the new projected image, the method 600 returns to step 606. If, on the other hand, the method 600 determines that there are no more pixels, the method 600 proceeds to step 614. FIGS. 10, 11 and 12 describe exemplary embodiments for performing the three-dimensional projection in detail.

At step 614, the method 600 sorts the projected pixel locations within the projected image for the pixels within the translated and/or rotated input image. At step 616, the method 600 processes a pixel in the projected image. In some embodiments, the pixel is associated with an integer pixel location within an x-axis of a display area. At step 618, the method 600 selects two or more projected locations of which depth and/or intensity values from the translated and/or rotated input image are used to compute a depth and/or an intensity value for the processed pixel within the projected image. In some embodiments, the two or more projected locations are floating point pixel locations within a pre-defined distance (e.g., one pixel length) of the integer pixel location. As an example, the method 600 may select two projected pixel locations that are closest to the integer pixel location.

At step 620, the method 600 determines whether the processed pixel is occluded. In some embodiments, if the method 600 establishes that there are no pixels in the translated and/or rotated input image that map to projected pixel locations within the pre-defined distance from the integer pixel location, the processed pixel is occluded. If the processed pixel is occluded, the method 600 proceeds to step 622. At step 622, the method 600 stores the integer pixel location. After step 622, the method 600 proceeds to step 628. If, on the other hand, the processed pixel is not occluded, the method 600 proceeds to step 624.

At step 624, the method 600 interpolates values for the non-occluded pixel using values associated with the two or more projected locations. At step 626, the method 600 computes a depth and an intensity value using depth and intensity values form the two or more projected pixel locations. For example, a depth value from a closest projected pixel location is selected as the depth value for the processed pixel. As another example, intensity values from two closest projected pixel locations are blended to produce the intensity value for the processed pixel. At step 628, the method 600 determines if there is a next pixel in the projected image. If the method 600 determines that there is a next pixel, the method 600 returns to step 616. If, on the other hand, the method 600 determines that there are no more pixels within the projected image, the method 600 proceeds to step 630. At step 630, the method 600 ends.

Figure 7:
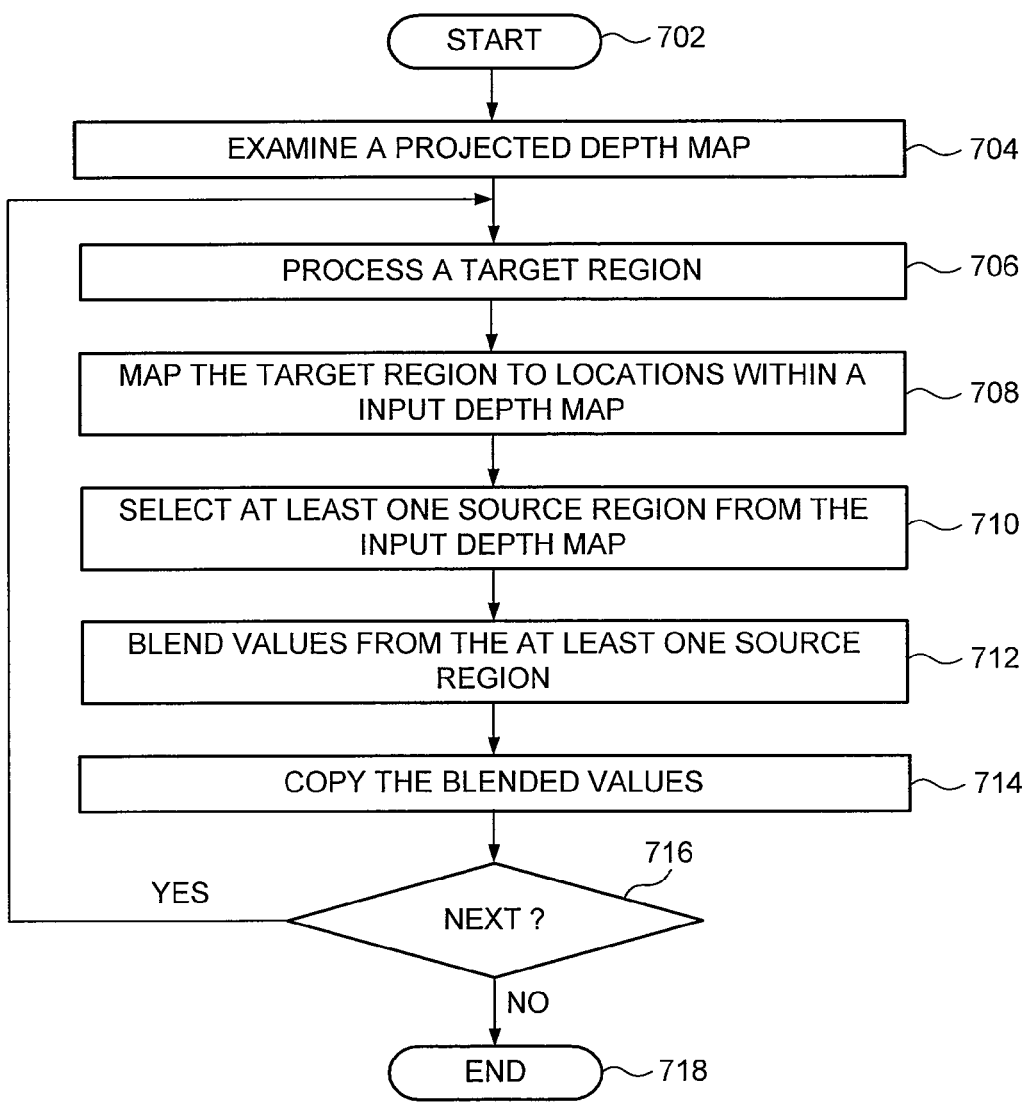
FIG. 7 is a flow diagram that illustrates a method for inpainting a depth map in accordance with at least one embodiment.

FIG. 7 is a flow diagram that illustrates a method 700 for inpainting a depth map in accordance with at least one embodiment. Each and every step of the method 700 may be performed by an inpainting module (e.g., the inpainting module 210 of FIG. 2) of an image processor (e.g., the image processor 206 of FIG. 2). In other embodiments, one or more steps of the method 700 are omitted. The method 700 starts at step 702 and proceeds to step 704.

At step 704, the method 700 examines the depth map, such as a projected depth map (e.g., the projected depth map 126 of FIG. 1). At step 706, the method 700 processes a target region. In some embodiments, each occluded region is also a target region to be inpainted. At 708, the method 700 maps the target region to locations within an input depth map or a transformed input depth map. In some embodiments, the input depth map or the transformed input depth map is associated with a center viewpoint. At step 710, the method 700 selects one or more source regions within the input image or the transformed input image. These source regions may include pixels that are located to the right of a region that corresponds with the target region according to a forward projection from the input depth map onto the projected depth map. At step 712, the method 700 blends values from the one or more source regions. At step 714, the method 700 copies the blended values to the target region.

At step 716, the method 700 determines if there is a next target in the projected depth map. If the method 700 determines that there are more target regions, the method 700 returns to step 706. If, on the other hand, the method 700 determines that there are no more target regions within the projected depth map, the method 700 proceeds to step 718. At step 718, the method 700 ends.

Figure 8:
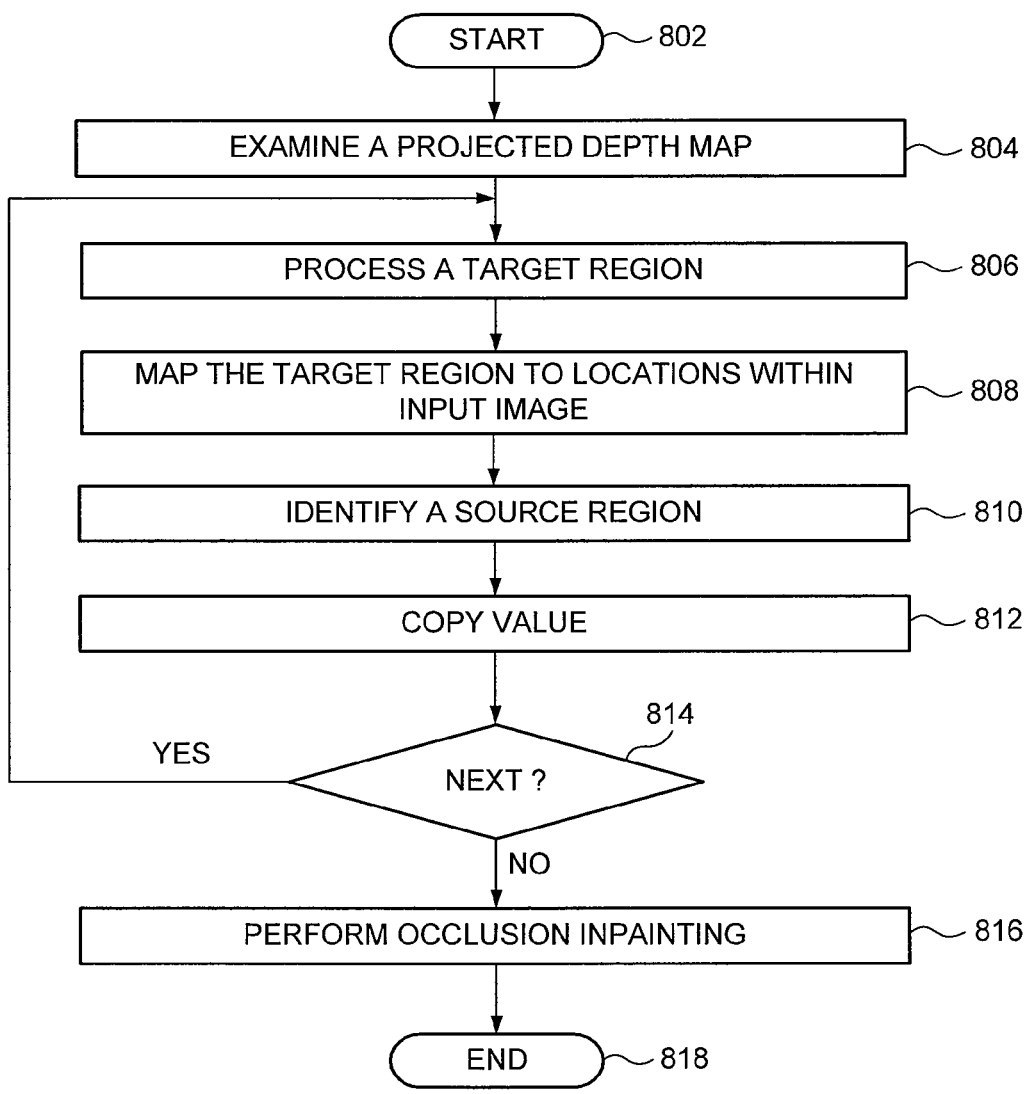
FIG. 8 is a flow diagram that illustrates a method for inpainting a projected image in accordance with at least one embodiment.

FIG. 8 is a flow diagram that illustrates a method 800 for inpainting a projected image in accordance with at least one embodiment. In some embodiments, the method 800 inpaints at least two copies of the projected image, which are later blended to produce an output image. In some embodiments, the method 800 performs primitive inpainting on target regions within a copy of projected image and then, performs exemplar-based inpainting on target regions within another copy. Each and every step of the method 800 may be performed by an inpainting module (e.g., the image inpainting module 210 of FIG. 2) of an image processor (e.g., the image processor 206 of FIG. 2). In other embodiments, one or more steps of the method 800 are omitted.

The method 800 starts at step 802 and proceeds to step 804. At step 804, the method 800 examines a projected depth map. At step 806, the method 800 processes a target region. The target region may be an occluded region. At step 808, the method 800 maps the target region to locations within an input image. At step 810, the method 800 identifies a source region within the input image. In some embodiments, mapping information identifies pixels within the input image, such as a center image, that project to non-occluded pixels that are located to the right of the target region. The method 800 uses the identified pixels as a potential source region for patching the target region. At step 812, the method 800 copies values from the source region into the target region.

At step 814, the method 800 determines if there is a next target region in the projected image. If the method 800 determines that there any more target regions, the method 800 returns to step 806. If, on the other hand, the method 800 determines that there are no more target regions within the projected image, the method 800 proceeds to step 816. At step 816, the method 800 performs occlusion inpainting, such as three-dimensional occlusion inpainting. At step 818, the method 800 ends.

Figure 9:
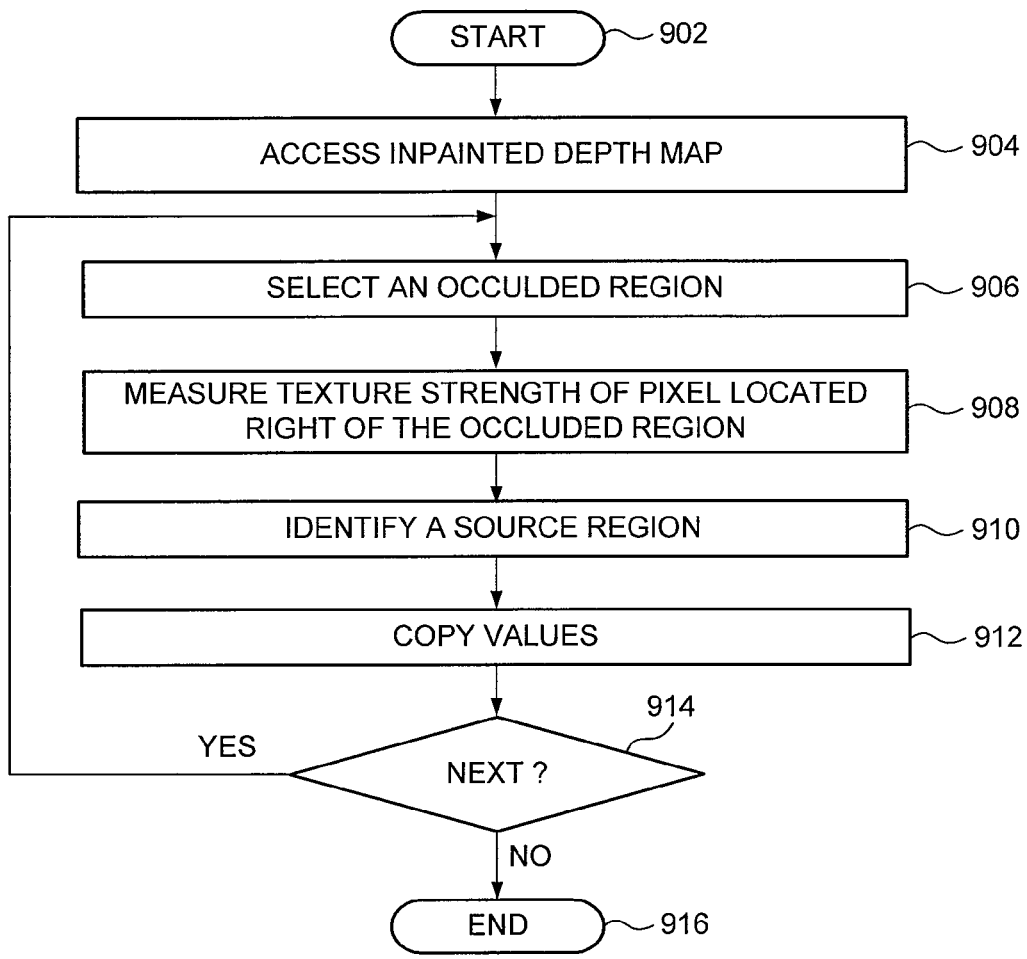
FIG. 9 is a flow diagram that illustrates a method for performing three-dimension occlusion inpainting on a projected image in accordance with at least one embodiment.

FIG. 9 is a flow diagram that illustrates a method 900 for performing three-dimensional occlusion inpainting on a projected image in accordance with at least one embodiment. Each and every step of the method 900 may be performed by an inpainting module (e.g., the image inpainting module 210 of FIG. 2) of an image processor (e.g., the image processor 206 of FIG. 2). In other embodiments, one or more steps of the method 900 are omitted.

The method 900 starts at step 902 and proceeds to step 904. At step 904, the method 900 accesses an inpainted depth map. The inpainted depth map provides depth values for one or more occluded regions. These regions were identified during pixel interpolation, as described in detail further below for FIG. 13. At step 906, the method 900 selects a target region. The target region may be a block of pixels that includes a portion of an occluded region and a portion of a non-occluded region. At step 908, the method 900 measures a degree of texture strength for each pixel or block of pixels that is located to a right of the occluded region, which is stored in texture information. As explained further below, the texture information is used for blending pixels. At step 910, the method 900 identifies a source region based on pixel similarity.

In some embodiments, the method 900 identifies blocks that satisfy a depth condition as candidate patches. Once the method 900 defines a search range, the method 900 searches blocks of pixels within the search range for a candidate patch that matches the target region. In order to optimize the search process, the method 900 only compares certain candidate blocks that satisfy the depth condition as a threshold defined by the following equation:

$$d_{\Psi_s} > C_d * d_\Omega$$

In this equation, $d_{\Psi_s}$ denotes a depth value of any pixel in a particular candidate patch, such as a right-side block of the source region, and $d_\Omega$ refers to a mean depth value of the target region within the block being inpainted. In some embodiments, $C_d$ is set to the floating point value of 0.8. The value of 0.8 is used to illustrate the searching process and is not intended to limit the depth condition, which may use any floating point value as a weight for comparing depth values as long as the floating point value complies with the condition $0 < C_d <= 1.0$.

In some embodiments, the inpainted depth map provides the depth values for the target region, which are averaged to produce the mean depth value. After computing the mean depth value, the method 900 compares the mean depth value to a depth value of each and every pixel in the particular candidate block. If at least one of the pixels satisfies the depth condition, then the method 900 computes a distortion cost between the particular candidate block and the selected block to be inpainted. If none of the pixels satisfy the depth condition, the method 900 proceeds to another candidate block within the defined search range.

At step 912, the method 900 copies values from the source region onto the selected occluded region. At step 914, the method 900 determines if there is a next occluded region in the projected image. If the method 900 determines that there is at least one more occluded region, the method 900 returns to step 906. If, on the other hand, the method 900 determines that there are no more occluded regions within the right eye image, the method 900 proceeds to step 916. At step 916, the method 900 ends.

FIG. 10 depicts a view 1000 in accordance with at least one embodiment. The view 1000 is a direction at which light from a plurality of light sources 1002 projects onto a right eye 1016 and a left eye 1018 and intercepts a display window 1020. For example, the view 1000 may be a right view, a left view, a center view and/or the like. Each point of interception is a projected pixel location within a left eye image and a right eye image as explained further in the descriptions for FIG. 11 and FIG. 12.

Physical pixel locations for the projected pixel locations correspond with orthogonal projections from the light sources 1002 onto the display window 1020. For example, the light source $1002_3$ is associated with a depth 1004, which refers to a distance to a physical pixel location 1006, which is projected onto a left eye location 1008 and a right eye location 1010. The left eye location 1008 and/or the right eye location 1010 may be floating point and/or integer pixel locations within the display window 1020. Measurement 1012 refers to half of a size of the display window 1020. A disparity 1014 refers to a distance between the left eye 1016 and the right eye 1018. The measurement 1012 and the disparity 1014 are used to compute a physical pixel location 1006 for the left eye location 1008 as well as compute the right eye location 1010 that maps to the physical pixel location 1006.

pow FIG. 11 depicts physical pixel location computation 1100 of the view 1000 in accordance with at least one embodiment. Light source 1102 is one of the plurality of light sources $1002_N$. The light source 1102 is associated with a depth value 1104 (d), which represents a relative distance (e.g., an orthogonal distance) to a physical pixel location 1106 on a display area 1110 (i.e., a screen). Hence, the light source 1102 and the physical pixel location 1106 share an x-axis displacement value (x). Light from the light source 1102 to a left eye 1114 intersects the display area 1110 at pixel 1108. Generally, the pixel 1108 corresponds with an integer pixel location (i) in an input image, such as a left eye image. Using a measurement 1112 (D) that is equal to half of the display area 1110, the x-axis displacement value (x) for the physical pixel location 1106 is computed using the following equation where p equals a single pixel length and f represents a distance from the left eye 1114 to the display area 1110:

$$x = \frac{(d+f)*p*(i-1)-d*D}{f}$$

FIG. 12 depicts projected pixel location computation 1200 of the view 1000 after the physical pixel location computation 1100 in accordance with at least one embodiment. Light from the light source 1102 travels to a right eye 1202 and intersects the display area 1110 at a projected pixel location 1204 (r(x)). The projected pixel location 1204 generally refers to a floating point location within a projected image, such as a right eye image. A disparity 1206 (b) represents a distance between the right eye 1202 and the left eye 1114, which is utilized along with the measurement 1110 (D) in the following equation to compute an x-axis displacement value for the projected pixel location 1204:

$$r(x) = \frac{d*(b+D)+f*x}{d+f}$$

Because the projected pixel location 1204 is a floating point location, the projected pixel location computation 1200 also identifies a closest integer pixel location within the projected image. Using the following equation, an index ($i_r$) for the closest integer pixel location is computed:

$$i_r = \frac{r(x)}{p} + 1$$

Figure 13:
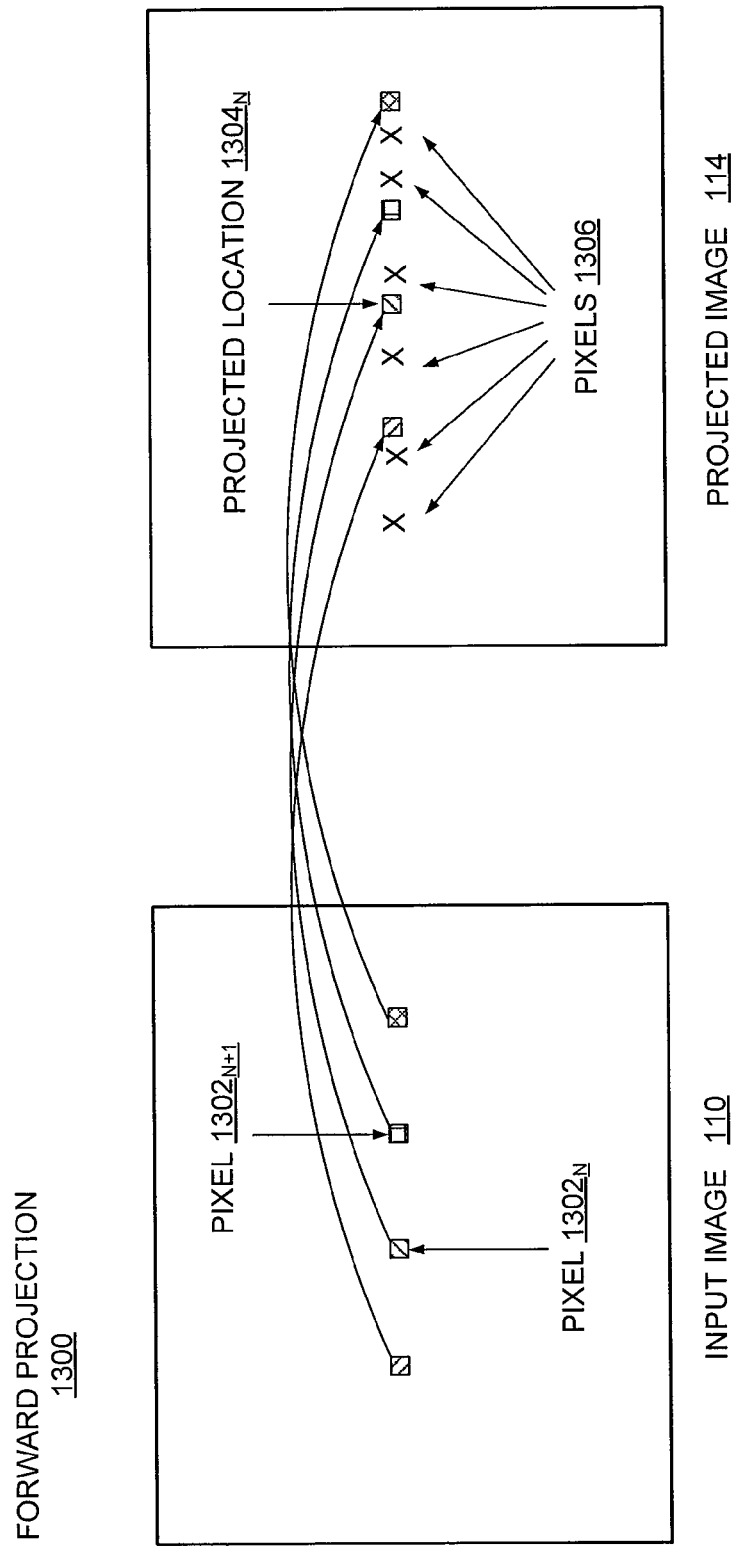
FIG. 13 depicts a forward projection from an input image onto a projected image using physical locations of pixels in accordance with at least one embodiment.

FIG. 13 depicts a forward projection 1300 from the input image 110 onto the projected image 114 using physical locations of pixels 1302 in accordance with at least one embodiment. After computing the physical locations, each pixel $1302_N$ is mapped to a projected location $1304_N$ in the projected image 114. The projected location $1304_N$ is a floating point location within one pixel length of a pixel $1306_N$. In some embodiments, using information from one or more pixels 1302 that map to one or more projected locations 1304 within the one pixel length of the pixel $1306_N$, a depth value and an intensity value are interpolated for the pixel $1306_N$ as explained in detail for FIG. 14.

Figure 14:
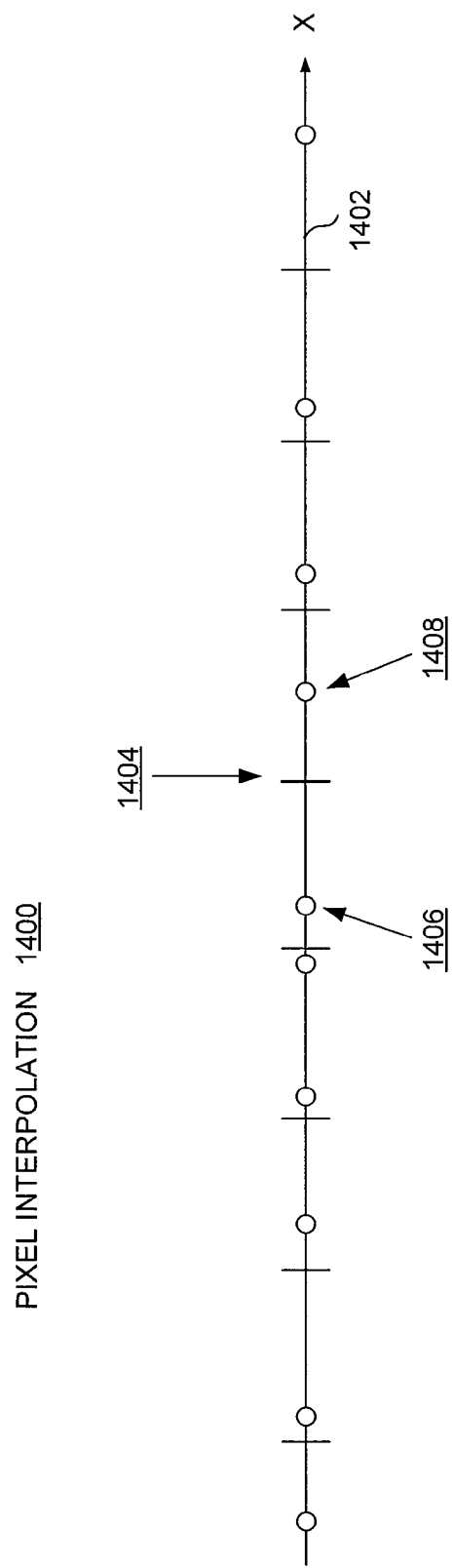
FIG. 14 depicts intensity and depth interpolation for pixels in the projected image in accordance with at least one embodiment.

FIG. 14 depicts an intensity and depth interpolation 1400 for the pixels 1306 along a display area 1402 in the projected image in accordance with at least one embodiment. Specifically, the pixels 1306 are located at integer locations along an x-axis of the display area 1402. A pixel 1404 is a current integer pixel location. In order to compute an intensity or a depth value for the pixel 1404, intensity or depth values from two or more of the projected pixel locations 1304, such as a projected pixel location 1406 and a projected pixel location 1408, are compared according to one or more embodiments. In some embodiments, depth and/or intensity values for the projected pixel location 1406 and the projected pixel location 1408 are blended. In other embodiments, a depth and/or an intensity value of a closest projected pixel location is selected to be the depth and/or the intensity value for the pixel 1404.

Figure 15:
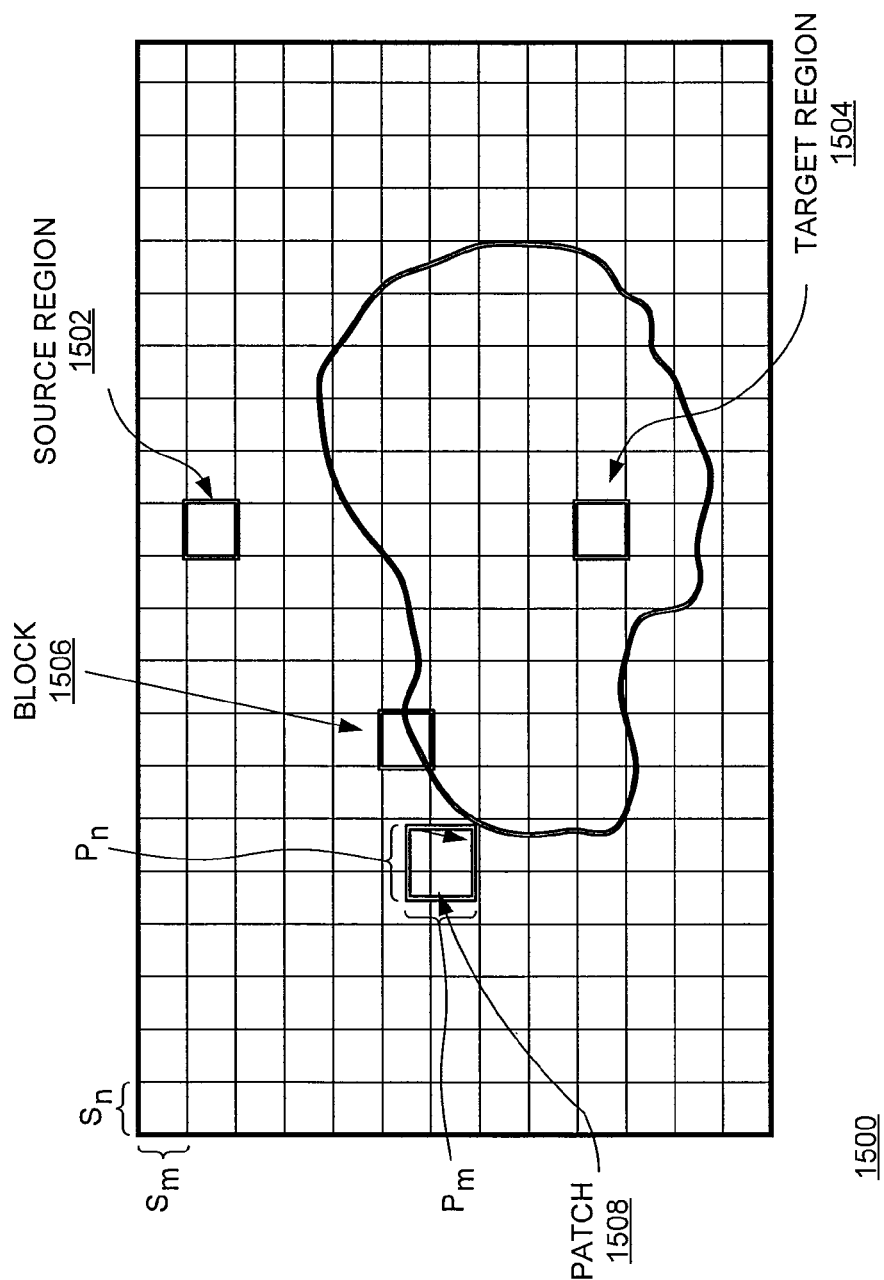
FIG. 15 depicts a graphical representation of an image to be inpainted in accordance with at least one embodiment.

FIG. 15 depicts a graphical representation of an image 1500 to be inpainted in accordance with at least one embodiment. The image 1500 includes at least one source region 1502, at least one target region 1504 and at least one block 1506 according to one or more embodiments. In some embodiments, the target regions 1504 form occluded regions that were identified during a forward projection. The source region 1502 includes blocks of pixels that include pixel information, such as intensity values. The target region 1504 also includes blocks of pixels, but these blocks may include no and/or incorrect pixel information (i.e., the target region 1504 is a portion of the image 1500 being in-painted using pixel information from the source region 1502). Blocks within a pre-defined or dynamic search area are selected as one or more candidate patches 1508 for image inpainting as described further below.

The search area includes pixels from the source region 1502 and the target region 1504, where each block 1506 overlaps a portion of the source region 1502 and a portion of the target region 1504. As such, the block 1506 includes the intensity and depth values provided by the overlapping portions of the source region 1502 as well as depth values from an inpainted right eye depth map according to one or more embodiments.

The target region 1504 may be inpainted using various techniques. In some embodiments, exemplar-based or graph-cut inpainting is employed to determine values for each pixel in the target region 1504. These values are copied or modified from pixels within the source region 1502. Alternatively, these values are copied from a source region within another image. For example, the values may be copied from a portion of an original input image or a transformed input image (i.e., pixel locations are translated and/or rotated). Because the other image may also function as a left eye image for the image 1500 (i.e., a right eye image), blocks of pixels that are located to the right of a block that maps to the block 1506 differ the least. In other words, the right-side blocks in the other image most likely have a minimal dissimilarity with the block 1506. Accordingly, a candidate patch search commences with the right-side blocks, which reduces computing time and conserves computer resources.

Intensity values associated with the blocks in the source region 1502 of the search area are used to determine optimal intensity values for pixels in the portion of the block 1506 containing a portion of the target region 1504. The intensity values of the blocks of the source region are prioritized and/or weighted according to a distance between each center pixel to a center pixel of the block 1506. Between two or more neighboring blocks, for example, a lower priority (i.e., weight) is assigned to the neighboring block that is further way from the block 1506. A higher priority, however, is assigned to the neighboring block that is on a right side of the block 1506. In some embodiments, the search area is defined as a dynamic range of a number of pixels from a center pixel of the block 1506 towards a right, a top or a bottom direction.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated display device via inter-computer communication. Some or all of the device components or data structures may also be stored (e.g., as instructions or structured data) on a computer-accessible medium or a portable article to be read by an appropriate drive, various examples of which are described above. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While, the present invention is described in connection with the preferred embodiments of the various figures. It is to be understood that other similar embodiments may be used. Modifications/additions may be made to the described embodiments for performing the same function of the present invention without deviating therefore. Therefore, the present invention should not be limited to any single embodiment, but rather construed in breadth and scope in accordance with the recitation of the appended claims.

While the foregoing is directed to embodiments of the present invention, other and further embodiments of the invention may be devised without departing from the basic scope thereof, and the scope thereof is determined by the claims that follow.

The invention claimed is:

1. A computer-implemented method for multi-view image generation using depth map information, the method being executed by one or more processors and comprising:

transforming an input image and an input depth map into a new view that is distinct from a view of the input image and the input depth map;

converting a input image and an input depth map into a projected image and a projected depth map using values from physical pixel locations that map to projected pixel locations, wherein the projected image and the projected depth map are associated with the new view;

identifying one or more occluded regions in the input image and the input depth map;

inpainting the projected image and the projected depth map and inpainting the one or more occluded regions with pixels associated with locations to the right of one or more occluded regions; and producing an output image in a direction of the particular view using the inpainted projected image and the inpainted projected depth map.

2. method of claim 1, wherein converting the input image and the input depth map further comprising:

performing a forward projection from the transformed input image and the transformed input depth map onto the projected image and the projected depth map.

3. The method of claim 1, wherein converting the input image and the input depth map further comprising:

for each pixel in the input image:

determining a physical location in the input image, and mapping the physical location to a projected location in the projected image.

4. The method of claim 3 further comprising sorting the projected pixel locations in the projected image.

5. The method of claim 3 further comprising for at least one pixel in the projected image, computing a value using at least two projected locations in the projected image, wherein the value comprises at least one of an intensity or a depth.

6. The method of claim 5, wherein computing the value further comprises interpolating at least two values associated with at least two pixels in the input image that map to the at least two projected locations.

7. The method of claim 6, wherein the at least two values comprise at least one of a value associated with a closest projected location, a value associated with a projected location having a lower depth or a value associated with a projected location having a minimum depth within a horizontal display area having a size of at least one pixel.

8. The method of claim 1, wherein inpainting the projected image and the projected depth map further comprises for each occluded region in the projected depth map, copying at least one value from at least one source region within the input depth map, wherein the at least one source region maps to at least one portion of the each occluded region.

9. The method of claim 8, wherein the at least one source region maps to a right most portion of the each occluded region.

10. The method of claim 1, wherein inpainting the projected image and the projected depth map further comprises for each occluded region in the projected image, processing at least one value from at least source region within the input image, wherein the at least one source region maps to at least a portion of the each occluded region.

11. The method of claim 1, wherein producing the output image further comprises blending at least two inpainted images.

12. The method of claim 1, wherein converting the input image and the input depth map further comprises identifying at least one occluded region within the projected image and the projected depth map.

13. An apparatus for multi-view generation of an image using depth map information, comprising:
a lens module for capturing an input image; and
a processor having modules comprising:
depth map storage comprising an input depth map; and
an image processor for transforming an input image and an input depth map into a new view that is distinct from a view of the input image and the input depth map, converting the input image and the input depth map into a projected image and a projected depth map using values from physical pixel locations that map to projected pixel locations, wherein the projected image and the projected depth map are associated with the new view, identifying one or more occluded regions in the input image and the input depth map, inpainting the projected image and the projected depth map and inpainting the one or more occluded regions with pixels associated with locations to the right of one or more occluded regions and producing an output image that forms the view using the inpainted projected image and the inpainted projected depth map.

14. The apparatus of claim 13, wherein the image processor further comprises:
a depth map inpainting module for copying values from at least one source region within the input depth map for each target region in the projected depth map, wherein the at least one source region corresponds with the projected pixel locations within the transformed input depth map for the each target region;
an image inpainting module for copying values from at least one source region within the transformed input image for each target region in a copy of the projected image, wherein each source region maps to pixels that are located right of the each target region and inpainting occluded regions within another copy of the projected image using the inpainted transformed input depth map and texture information; and
an output module for blending the inpainted copy of the projected image and the other inpainted copy of the projected image.

15. The apparatus of claim 13, wherein the convertor, for each pixel in the input image, determines a physical location and maps the physical location to a projected location in the projected image.

16. The apparatus of claim 15, wherein the convertor, for each pixel in the projected image, computes a depth value and an intensity value using at least two projected locations for at least two pixels in the input image.

17. The apparatus of claim 16, wherein the convertor interpolates at least two values associated with the at least two pixels, wherein the at least two pixels comprise at least one of a pixel associated with a closest projected location, a pixel associated with a projected location having a lowest depth value amongst the at least two pixels or a pixel associated with a projected location having a lowest depth within a horizontal display area having a size of at least one pixel.

18. A non-transitory computer readable storage medium comprising one or more processor executable instructions that, when executed by at least one processor, causes the at least one processor to perform a method comprising:
transforming an input image and an input depth map into a new view that is distinct from a view of the input image and the input depth map;
converting a input image and an input depth map into a projected image and a projected depth map using values from physical pixel locations that map to projected pixel locations, wherein the projected image and the projected depth map are associated with the new view;
identifying one or more occluded regions in the input image and the input depth map;
inpainting the projected image and the projected depth map and inpaintinq the one or more occluded regions with pixels associated with locations to the right of one or more occluded regions; and
producing an output image in a direction of the particular view using the inpainted projected image and the inpainted projected depth map.

19. The computer-readable-storage medium of claim 18, wherein the one or more processor executable instructions perform the method further comprising:
performing a forward projection from the transformed input image and the transformed input depth map onto the projected image and the projected depth map.

20. The computer-readable-storage medium of claim 18, wherein the one or more processor executable instructions perform the method further comprising:
for each pixel in the input image:
determining a physical location, and
mapping the physical location to a projected location in the projected image.

* * * * *